United States Patent
Heatherly et al.

(10) Patent No.: US 9,339,729 B2
(45) Date of Patent: *May 17, 2016

(54) SYSTEM AND METHOD FOR PLAYSETS USING TRACKED OBJECTS AND CORRESPONDING VIRTUAL WORLDS

(71) Applicant: Disney Enterprises, Inc., Burbank, CA (US)

(72) Inventors: Christopher W. Heatherly, Monrovia, CA (US); Christopher K. Shin, Glendale, CA (US); Natasha Berling, Los Angeles, CA (US); Robert Saygan, Ladera Ranch, CA (US); Leonard J. Mazzocco, Glendale, CA (US); Tara Cortner Hefter, Encino, CA (US)

(73) Assignee: Disney Enterprises, Inc., Burbank, CA (US)

( * ) Notice: Subject to any disclaimer, the term of this patent is extended or adjusted under 35 U.S.C. 154(b) by 233 days.

This patent is subject to a terminal disclaimer.

(21) Appl. No.: 13/860,434

(22) Filed: Apr. 10, 2013

(65) Prior Publication Data
US 2013/0231193 A1 Sep. 5, 2013

Related U.S. Application Data

(63) Continuation of application No. 12/462,140, filed on Jul. 29, 2009, now Pat. No. 8,939,840.

(51) Int. Cl.
| | |
|---|---|
| A63F 13/10 | (2006.01) |
| A63F 13/30 | (2014.01) |
| A63H 3/28 | (2006.01) |
| A63F 13/428 | (2014.01) |
| A63F 13/65 | (2014.01) |
| A63F 13/58 | (2014.01) |

(52) U.S. Cl.
CPC .............. *A63F 13/12* (2013.01); *A63F 13/428* (2014.09); *A63F 13/58* (2014.09); *A63F 13/65* (2014.09); *A63H 3/28* (2013.01); *A63H 2200/00* (2013.01)

(58) Field of Classification Search
USPC ...................................................... 463/31–43
See application file for complete search history.

(56) References Cited

U.S. PATENT DOCUMENTS

| | | | |
|---|---|---|---|
| 5,746,602 A | 5/1998 | Kikinis | |
| 5,853,327 A | 12/1998 | Gilboa | |
| 5,912,454 A | 6/1999 | Castillo | |
| 6,227,931 B1 | 5/2001 | Shackelford | |
| 6,290,565 B1 | 9/2001 | Galyean | |
| 6,460,851 B1 | 10/2002 | Lee | |
| 6,554,679 B1 | 4/2003 | Shackelford | |
| 6,773,325 B1 * | 8/2004 | Mawle et al. | 446/175 |
| 7,037,166 B2 | 5/2006 | Shrock | |
| 7,081,033 B1 * | 7/2006 | Mawle et al. | 446/175 |
| 7,663,488 B2 | 2/2010 | Kalama | |

(Continued)

*Primary Examiner* — Masud Ahmed
(74) *Attorney, Agent, or Firm* — Farjami & Farjami LLP

(57) ABSTRACT

There is provided a system and method for playsets using tracked objects and corresponding virtual worlds. There is provided an object for use with a physical environment and connectable to a virtual world corresponding to the physical environment, the object including a processor and a plurality of sensors including a position sensor. The processor is configured to establish a first connection with the virtual world, wherein the virtual world contains a virtual object corresponding to the object, determine a position of the object using the position sensor, and send the position of the object using the first connection. There is also provided a physical environment having similar capabilities as the object.

21 Claims, 4 Drawing Sheets

(56) References Cited

U.S. PATENT DOCUMENTS

| | | |
|---|---|---|
| 7,912,500 B2 | 3/2011 | Maschke |
| 8,157,611 B2 | 4/2012 | Zheng |
| 8,939,840 B2 * | 1/2015 | Heatherly et al. ............... 463/42 |
| 2002/0022507 A1 | 2/2002 | Dan |
| 2004/0214642 A1 | 10/2004 | Beck |
| 2005/0153623 A1 | 7/2005 | Shrock |
| 2007/0093173 A1 | 4/2007 | Zheng |
| 2007/0128979 A1 | 6/2007 | Shackelford |
| 2009/0029771 A1 | 1/2009 | Donahue |
| 2009/0137323 A1 * | 5/2009 | Fiegener et al. ............... 463/43 |
| 2009/0176432 A1 | 7/2009 | Hardin |
| 2010/0009735 A1 | 1/2010 | Seydoux |

* cited by examiner

Fig. 3
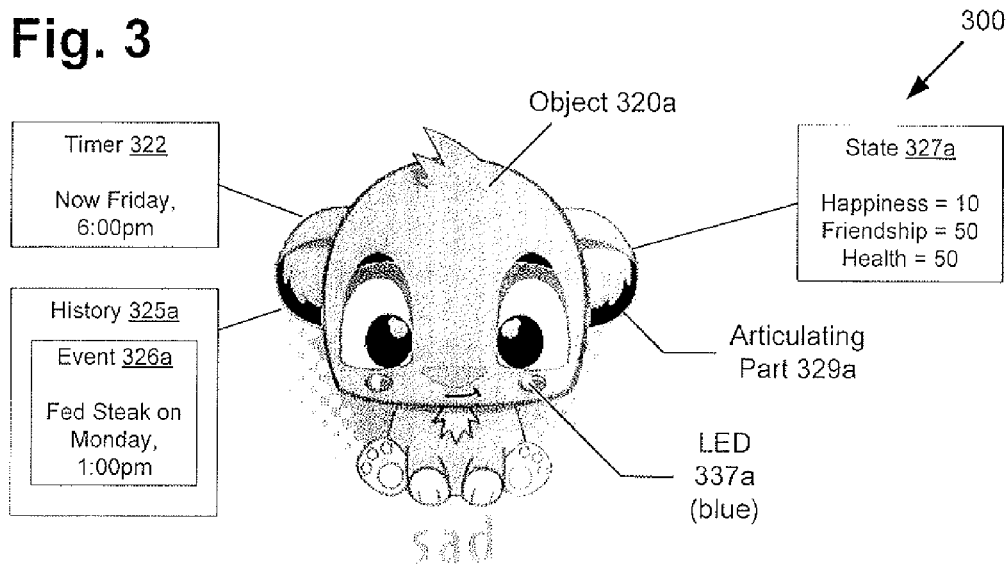
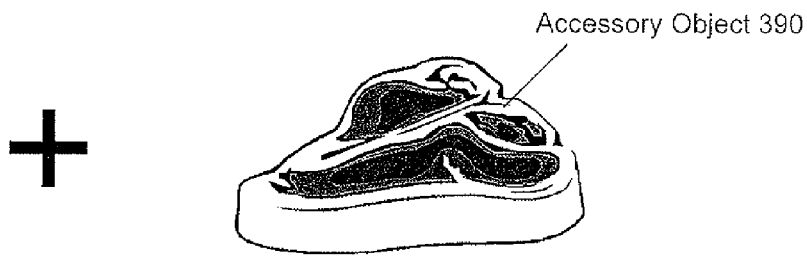
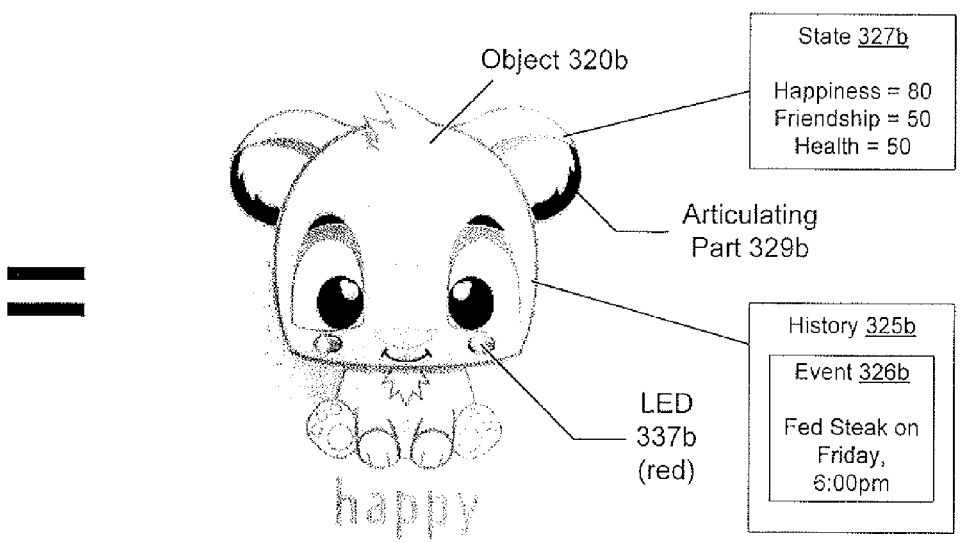

SYSTEM AND METHOD FOR PLAYSETS USING TRACKED OBJECTS AND CORRESPONDING VIRTUAL WORLDS

This application is a Continuation of U.S. application Ser. No. 12/462,140, filed Jul. 29, 2009, which is hereby incorporated by reference in its entirety.

BACKGROUND OF THE INVENTION

1. Field of the Invention

The present invention relates generally to interactive toys. More particularly, the present invention relates to interactive toys with sensing features and online play.

2. Background Art

Figural toys such as action figures, dolls, pets, and other forms are popular ways for both children and adults to display and interact with their favorite characters and personalities in a tangible form. Simplistic figural toys may have been dominant in the past, either relying on the imagination of the consumer or providing only canned responses to consumer interactions. However, with the rapid pace of technology and a new generation of consumers familiar with the Internet, social networks, and online games, there is an increased demand for sophisticated toys that better fit into modern networked lifestyles, particularly for tech savvy younger generations.

While virtual online worlds and social networks are providing new outlets for people to spend time, including decorating of virtual spaces with virtual objects, accessories, and other forms of expression, it cannot yet replace the enjoyment of handling, appreciating, and collecting tangible objects. In particular, tangible objects are amenable for a pattern of play geared towards nurturing and care, such as for a pet. By, for example, adding object, touch, sound, and motion sensors to a figural pet, a user can feed, pet, bathe, groom, and perform other interactions to nurture and care for the pet. While these same actions might also be simulated in a virtual environment, they may not provide the same sensory feedback and immediacy as a tangible object, as opposed to a merely passive computer display that can only visually display the simulated actions occurring in the virtual environment.

At the same time, virtual online worlds and social networks provide compelling features that are not typically available to standalone, non-networked toys. These features may include, for example, communication with friends and colleagues from school or around the world, participation in chat groups or forums, the ability to view other people's virtual collections and environments or to display your own, and exploring fantastic virtual worlds that may be difficult to simulate in a tangible way. As consumers have grown to use and take advantage of these networked experiences, greater integration of these networked services into products provides an attractive selling point.

Accordingly, there is a need to overcome the drawbacks and deficiencies in the art by providing a way for consumers to enjoy the benefits of tangible toy interaction while supporting the features of virtual online worlds.

SUMMARY OF THE INVENTION

There are provided systems and methods for playsets using tracked objects and corresponding virtual worlds, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 presents a diagram demonstrating a toy object providing a time contextual interaction, according to one embodiment of the present invention.

DETAILED DESCRIPTION OF THE INVENTION

The present application is directed to a system and method for playsets using tracked objects and corresponding virtual worlds. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
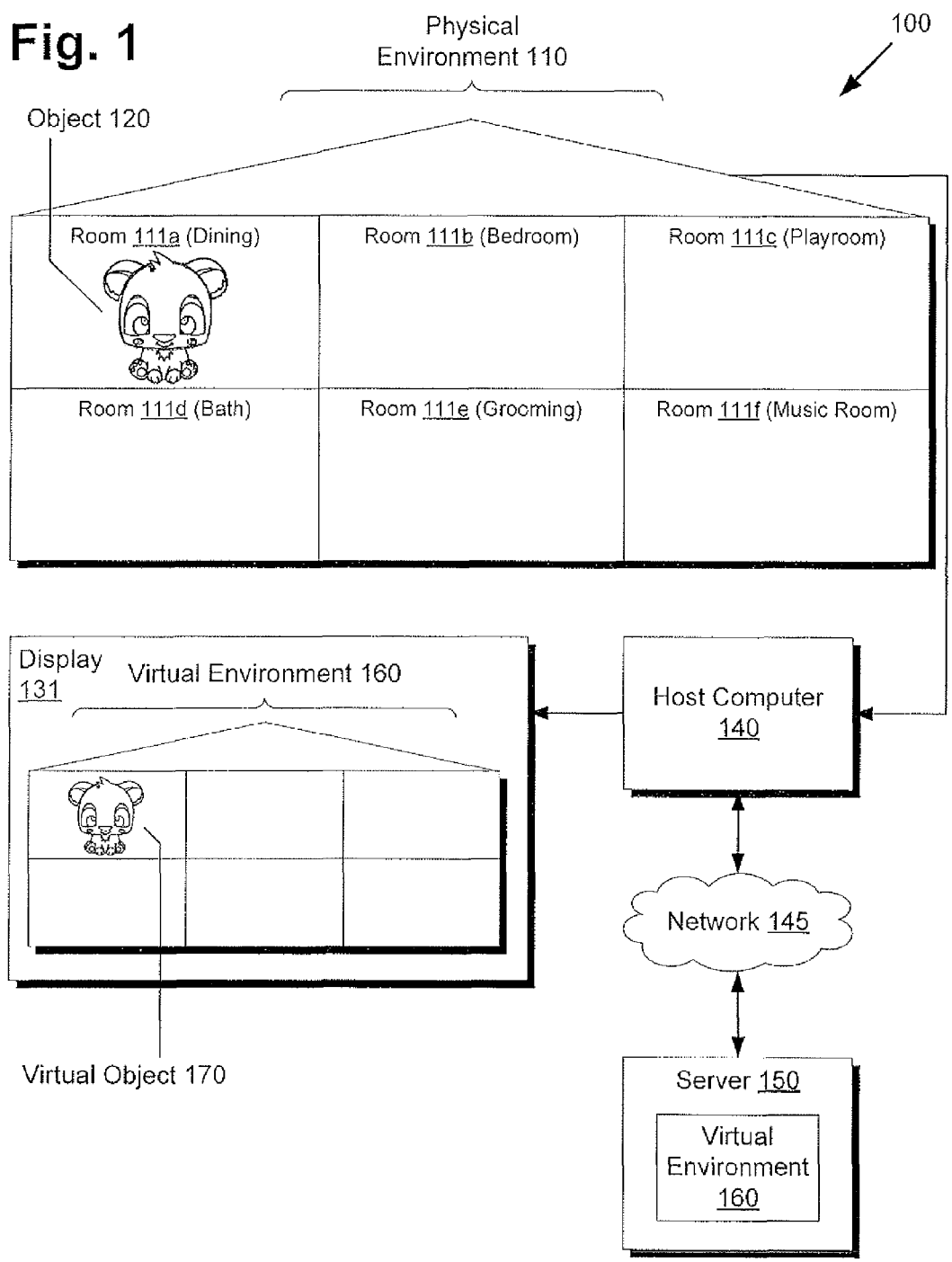
FIG. 1 presents a system for providing a playset environment using tracked objects and corresponding virtual worlds, according to one embodiment of the present invention.

FIG. 1 presents a system for providing a physical playset environment using tracked objects and corresponding virtual worlds, according to one embodiment of the present invention. Diagram 100 of FIG. 1 includes physical environment 110, object 120, display 131, host computer 140, network 145, server 150, virtual environment 160, and virtual object 170. Physical environment 110 includes rooms 111a-111f, with object 120 positioned in room 111a. Server 150 includes virtual environment 160. Virtual environment 160 also includes virtual object 170 in a position corresponding to room 111a.

FIG. 1 presents a broad overview of how figural toys can be used and tracked by playset environments and interfaced with virtual worlds. As shown by object 120, the figural toy in FIG. 1 is represented by a pet figure or plush toy, but could comprise other forms such as battle and action figures, dress up and fashion dolls, posing figures, game pieces for board games, robots, and others. Object 120 is placed in room 111a of physical environment 110, which may comprise a dining area of a playset or dollhouse. Although physical environment 110 is presented as a house or living space, physical environment 110 may also comprise other forms such as a game board.

By using some form of position sensor, physical environment 110 can be made aware of the three-dimensional coordinates of object 120, allowing object 120 to be located within a particular room from rooms 111a-111f. Position tracking can be implemented using any method known in the art, such as infrared tracking, radio frequency identification (RFID) tags, electromagnetic contacts, electrical fields, optical tracking, and others. Additionally, an orientation in space might also be detected to provide even more precise position tracking. This might be used to detect whether object 120 is facing a particular feature in physical environment 110. For example, if object 120 is facing a mirror within room 111*e*, a speaker embedded in object 120 might make a comment about how well groomed his mane is, whereas if object 120 has his back to the mirror, the speaker would remain silent.

Besides providing standalone functionality as a playset for use with object 120, physical environment 110 can also interface with virtual environment 160, a virtual world representation of physical environment 110. As shown in FIG. 1, physical environment 110 can communicate with virtual environment 160 by using host computer 140 to communicate with server 150 over network 145. A connection from physical environment 110 to host computer 140 might be supported through a Universal Serial Bus (USB) connection using a client daemon or middleware program service running on host computer 140, and network 145 might comprise a public network such as the Internet. The middleware program might, for example, be provided to the consumer on disc media or as a download when object 120 is purchased at retail. The middleware program may scan USB devices for the presence of physical environment 110 and act as a communications intermediary between physical environment 110, object 120, host computer 140, and server 150. Alternatively, physical environment 110 or object 120 may include embedded WiFi, Bluetooth, 3G mobile communications, WiMax, or other wireless communications technologies to communicate over network 145 directly instead of using the middleware program on host computer 140 as an intermediary to access network 145.

For example, a client application or web browser on host computer 140 might access a virtual world or website on server 150 providing access to virtual environment 160. This client application may interface with the middleware program previously described to communicate with physical environment 110 and object 120, or communicate directly over network 145 if direct wireless communication is supported. The client application or web browser of host computer 140 may then present a visual depiction of virtual environment 160 on display 131, including virtual object 170 corresponding to object 120. Since server 150 can also connect to other host computers connected to network 145, virtual environment 160 can also provide interactivity with other virtual environments and provide features such as online chat, item trading, collection showcases, downloading or trading of supplemental or user generated content, synchronization of online and offline object states, and other features.

Additionally, the position of virtual object 170 in relation to virtual environment 160 can be made to correspond to the position of object 120 in relation to physical environment 110. For example, if the consumer or user moves object 120 right to the adjacent room 111*b*, then virtual object 170 may similarly move right to the corresponding adjacent room in virtual environment 160. In another example, if a furniture accessory object is placed in room 111*b* against the left wall and lacing towards the right, a corresponding virtual furniture accessory object may be instantiated and also placed in a corresponding room of virtual environment 160 with the same position against the left wall and orientation facing towards the right. In this manner, a consumer can easily add a virtual version of a real object without having to enter a tedious unlocking code or complete another bothersome registration process. If the real object is removed from physical environment 110, then the virtual object may also be removed, allowing the real object to provide the proof of ownership. Alternatively, inserting the real object into physical environment 110 may provide permanent ownership of the virtual object counterpart, which may then be moved to a virtual inventory of the consumer. Further, the correspondence of real and virtual positions may be done in a continuous fashion such that positioning and orientation of objects within physical environment 110 are continuously reflected in virtual environment 160, providing the appearance of real-time updates for the consumer.

A similar functionality in the reverse direction might also be supported, where movement of virtual object 170 causes a corresponding movement of object 120 through the use of motors, magnets, wheels, or other methods. Moreover, each object may have an embedded identifier to allow physical environment 110 to track several different objects or multiple objects simultaneously. This may allow, for example, special interactions if particular combinations of objects are present in specific locations. In this manner, various types of virtual online and tangible or physical interactions can be mixed together to provide new experiences.

One example of mixing virtual online and tangible interactions might be virtual triggers affecting the tangible environment, also referred to as traps or hotspots. If object 120 is moved to room 111*c*, the playroom, then a trigger within the corresponding area in virtual environment 160 might be initiated. As a result of the trigger, corresponding virtual object 170 might then enact a short drama story on a stage with other virtual objects, for example. Interactive elements of physical environment 110 such as switches, levers, doors, cranks, and other mechanisms might also trigger events or other happenings within virtual environment 160. Similarly in the other direction, elements of virtual environment 160 might also affect physical environment 110. For example, if an online friend selects a piece of music to play in virtual environment 160, the music might also be streamed and output to a speaker in room 111*f*, the music room. Decorative wallpaper might be selected to decorate virtual environment 160, causing corresponding wallpaper to be displayed in physical environment 110 using, for example, a scrolling paper roll with preprinted wallpaper, LCD screens, electronic ink, or other methods.

Figure 2:
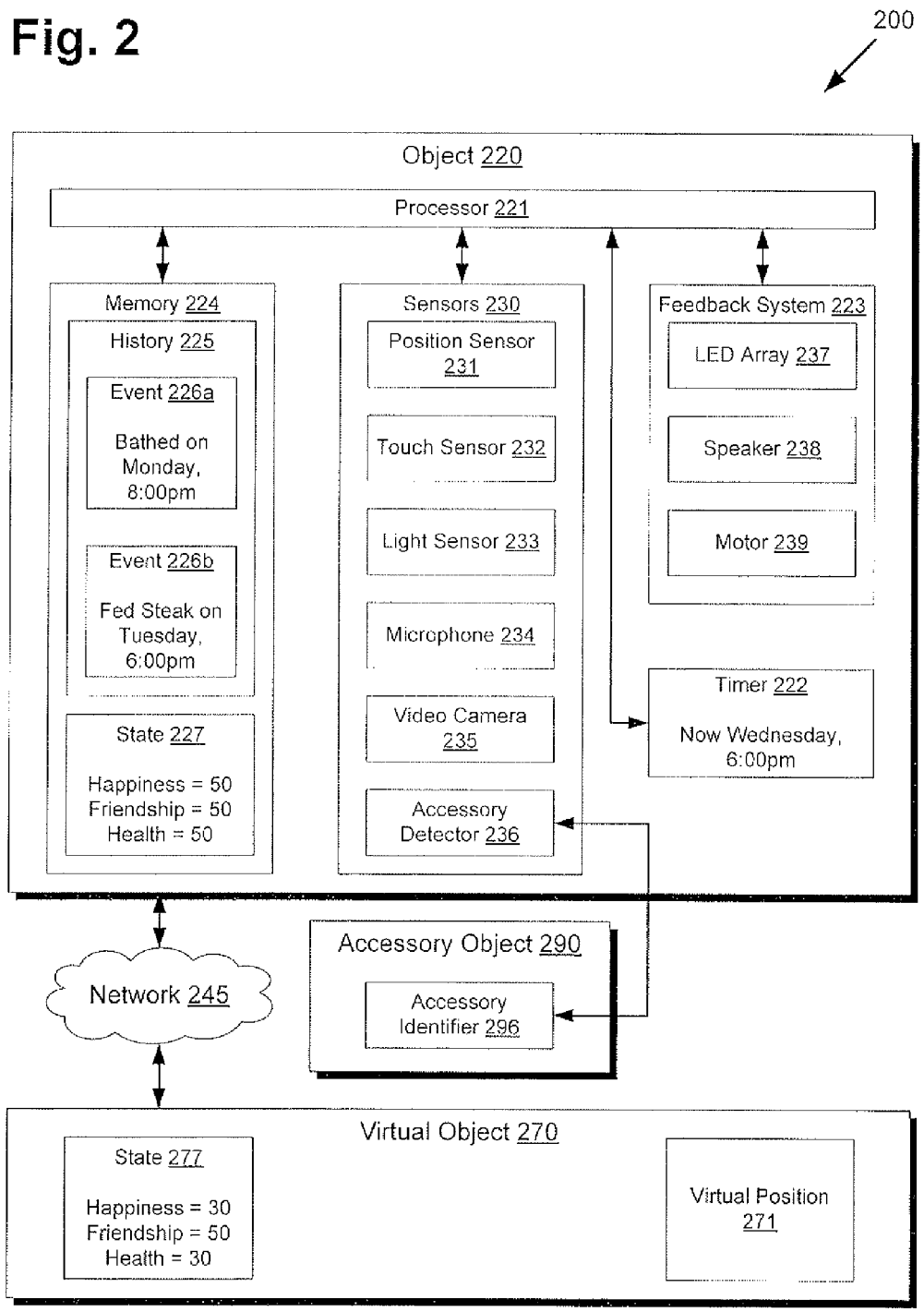
FIG. 2 presents a toy object interacting with an accessory object and a virtual object corresponding to the toy object, according to one embodiment of the present invention.

Moving to FIG. 2, FIG. 2 presents a toy object interacting with an accessory object and a virtual object corresponding to the toy object, according to one embodiment of the present invention. Diagram 200 of FIG. 2 includes object 220, network 245, virtual object 270, and accessory object 290. Object 220 includes processor 221, timer 222, feedback system 223, memory 224, and sensors 230. Feedback system 223 includes light emitting diode (LED) array 237, speaker 238, and motor 239. Memory 224 includes history 225 and state 227. History 225 includes event 226*a* and event 226*b*. Sensors 230 include position sensor 231, touch sensor 232, light sensor 233, microphone 234, video camera 235, and accessory detector 236. Virtual object 270 includes virtual position 271 and state 277. Accessory object 290 includes accessory identifier 296. With regards to FIG. 2, it should be noted that object 220 corresponds to object 120 from FIG. 1, that network 245 corresponds to network 145, and that virtual object 270 corresponds to virtual object 170.

FIG. 2 presents a more detailed view of components that may comprise a toy object. Although not shown in FIG. 2, a rechargeable battery or another power source may provide the power for the components of object 220. Processor 221 may comprise any processor or controller for carrying out the logic of object 220. In particular, an embedded low power microcontroller may be suitable for minimizing power consumption and extending battery life. Timer 222 may comprise, for example, a real-time clock (RTC) for keeping track of the present date and time. A separate battery might provide power specifically for timer 222 so that accurate time can be maintained even if primary battery life is drained. Feedback system 223 includes various parts for providing feedback to a consumer, such as emitting lights from LED array 237, emitting sound through speaker 238, and moving object 220 using motor 239.

Object 220 also includes sensors 230 for detecting and determining inputs and other environmental factors, including position sensor 231 for determining a position of object 220, touch sensor 232 for detecting a touch interaction with object 220, light sensor 233 for detecting an ambient light level, microphone 234 for recording sound, video camera 235 for recording video, and accessory detector 236 for detecting a presence of an accessory object. These sensors may be used to initiate actions that affect the emotional and well-being parameters of object 220, represented within state 227.

For example, touch sensor 232 may be used to detect petting of object 220, which may cause the happiness parameter of state 227 to increase or decrease depending on how often a consumer pets object 220. Light sensor 233 may detect the amount of ambient light, which may be used to interpret how much time object 220 is given to sleep based on how long object 220 is placed in a dark environment. Sufficient sleep might cause the health parameter of state 227 to rise, whereas insufficient sleep may cause the health parameter to fall. Microphone 234 might be used to determine whether the consumer talks to object 220 or plays music for object 220, with more frequent conversations and music positively affecting the friendship parameter. Similarly, video camera 235 might record the expression of the consumer, where friendly and smiling expressions also positively affect the friendship parameter. Of course, the particular configuration of sensors, feedback systems, and state parameters shown in object 220 are merely exemplary and other embodiments may use different configurations depending on the desired application and available budget. For example, an application with fighting action figures might focus more on combat skills and battle training rather than nurturing and well-being parameters.

Moving to accessory detector 236, any of several different tracking technologies may be used to detect the presence and proximity of accessory objects, similar to position sensor 231. For example, accessory detector 236 might comprise a RFID reader, and accessory identifier 296 of accessory object 290 may comprise a RFID tag. Once accessory object 290 is brought into close proximity to object 220, accessory detector 236 can read accessory identifier 296, which indicates the presence of accessory object 290. This can be used to simulate various actions with object 220. For example, accessory object 290 might comprise a plastic food toy that triggers a feeding action with object 220. Other examples night include a brush for grooming, soap for bathing, trinkets for gifts, and other objects.

Additionally or alternatively, simply placing object 220 within a particular positional context could trigger a corresponding action. For example, examining FIG. 1, placing object 220 within room 111a might trigger feeding of food, within room 111b might trigger sleep, within room 113c might trigger play activities, within room 111d might trigger a bath, within room 111e grooming, and within room 111f listening to music. These activities may then affect the parameters in state 227 as previously discussed.

Besides including the state of object 220 as state 227, memory 224 also contains a record of past interactions with object 220 as history 225. As shown in history 225, two events 226a-226b are already recorded. Event 226a describes that object 220 was bathed with a timestamp of Monday at 8:00 pm. This event might be registered, for example, if the consumer moves the object 220 to room 111d of FIG. 1, or if accessory object 290 representing a piece of soap is brought within close proximity to accessory detector 236 of object 220. Timer 222 may have also been used to determine that the action also occurred on Monday at 8:00 pm. Similarly, event 226b describing that object 220 was fed a steak on Tuesday at 6:00 pm may have been registered by moving object 220 to room 111a of FIG. 1 or bringing accessory object 290 representing a steak within close proximity to accessory detector 236. These events might also be evaluated to influence the parameters in state 227, as previously described.

Of course, it should be noted that timer 222 is constantly updated to reflect the current time, which nay also be used to determine the effect of any events on state 227. For example, object 220 may be preprogrammed with a particular optimal schedule, or how often it prefers to be bathed, fed, petted, and so forth. If, for example, timer 222 progresses to the point where the last feeding event was a week ago, this information might be used by processor 221 to decrease the happiness parameter of state 227, as the pet may prefer to be fed at least once a day. On the other hand, repeatedly feeding the pet at closely spaced time intervals may decrease the health parameter, as overfeeding the pet is not optimal either. In this manner, time contextual interactivity can be provided to the consumer, enabling richer and more realistic experiences.

While object 220 may interface with virtual object 270, object 220 may not always have a continuous connection to the virtual world with virtual object 270, as the consumer might turn off the host computer providing the connection to network 245, network 245 might have connectivity issues, wireless signals might receive strong interference, or other circumstances may terminate the availability of network communications over network 245. In this case, it may be desirable for the consumer to still interact with object 220 and any associated tangible environment, and still be credited for those interactions when network communications is restored. For this reason, history 255 may contain a record of events that occur offline, so that once network 245 is available again, state 277 of virtual object 270 can be synchronized with state 277 of object 220.

For example, as shown in FIG. 2, state 277 of virtual object 270 corresponding to object 220 is out of date, as the happiness and health parameters are only 30, whereas in object 220 the happiness and health parameters have increased by 20 to 50. This may be attributed to events 226a-226b occurring offline, where event 226a, bathing, raised the health parameter by 20 points, and where event 226b, feeding steak, raised the happiness parameter by 20 points. After object 220 reestablishes a connection to virtual object 270 via previously down but now available network 245, then state 277 might also be updated to synchronize with state 227, also adding 20 points to the health and happiness parameters, Additionally, virtual position 271, representing the position of virtual object 270 in a corresponding virtual world, may also be updated to correspond to a position based on input readings from position sensor 233 of object 220, as previously described.

This synchronization could also occur in the other direction as well. For example, an online friend might send a virtual gift to virtual object 270, causing the happiness parameter of state 277 to rise by 10 points. When object 220 reestablishes a connection to virtual object 270 over previously down but now available network 245, those additional 10 points to happiness might also be added to state 227 of object 220. In this manner, both online and offline play are supported and actions within an offline or online context can be credited to the other context, thereby increasing consumer satisfaction and encouraging further play.

Although FIG. 2 focuses on toy objects, the elements contained with object 220, including processor 221, tinier 222, feedback system 223, memory 224, and sensors 230 might also be embedded in a corresponding environment, or tangible playset. In this manner, the playset, rather than the object, may gather sensor data and record events for exchanging with a virtual environment containing virtual object 270. Alternatively, the environment and the object may share and divide particular duties with regard to communications to a virtual environment. However, for simplicity, an embodiment where functions are primarily carried out by the toy object is presented in FIG. 2.

Moving to FIG. 3, FIG. 3 presents a diagram demonstrating a toy object providing a time contextual interaction, according to one embodiment of the present invention. Diagram 300 of FIG. 3 includes objects 320a-320b and accessory object 390. Object 320a includes timer 322, history 325a, state 327a, articulating part 329a, and LED 337a. History 325a includes event 326a. Object 320b includes history 325b, state 327b, articulating part 329b, and LED 337b. History 325b includes event 326b. With regards to FIG. 3, it should be noted that objects 320a-320b correspond to object 220 from FIG. 2, and that accessory object 390 corresponds to accessory object 290.

FIG. 3 presents an example time contextual interaction that a toy object may provide. Object 320a represents an initial state of the toy object, which is further explained through the information conveyed in timer 322, history 325a, and state 327a. As shown in history 325a, the last time the pet was fed was on Monday at 1:00 pm, whereas timer 322 indicates that the current time is Friday, 6:00 pm, or more than four days past the last time the pet was fed. This is also reflected in the low happiness parameter of 10 shown in state 327a, which may have been calculated using predetermined rules regarding preferred feeding frequency. Several visual indicators corresponding to elements of feedback system 223 of FIG. 2 also reflect the low happiness parameter, such as LED 337a glowing a depressed blue color on the cheeks, and articulating part 329a presenting droopy ears. While not shown in FIG. 3, a speaker embedded in object 320a might also, for example, play the sound of a grumbling stomach, or make a verbal request food.

Responding to the indicators, the consumer might bring accessory object 390, representing a steak, in close proximity to object 320a to simulate feeding the pet. As previously mentioned, various methods of detecting accessory object 390 such as RFID tags may be utilized. Once accessory object 390 is identified and processed by object 320a, object 320a may transition to the state shown by object 320b. As shown by state 327b, the happiness parameter has increased drastically from 10 to 80, the action of feeding is noted in history 325b as event 326b, and the visual indicators change to indicate the state of happiness, with LED 337b glowing a bright red and articulating part 329b presenting perked up ears. Although history 325b shows that event 326b replaces event 326a from history 325a, alternative embodiments may preserve both events, which may be used, for example, to detect whether overfeeding has occurred by analyzing the frequency of feeding events over time. In this manner, a toy object can provide various time contextual interactions, providing deeper game play mechanics than objects focusing on canned and immediate responses.

Figure 4:
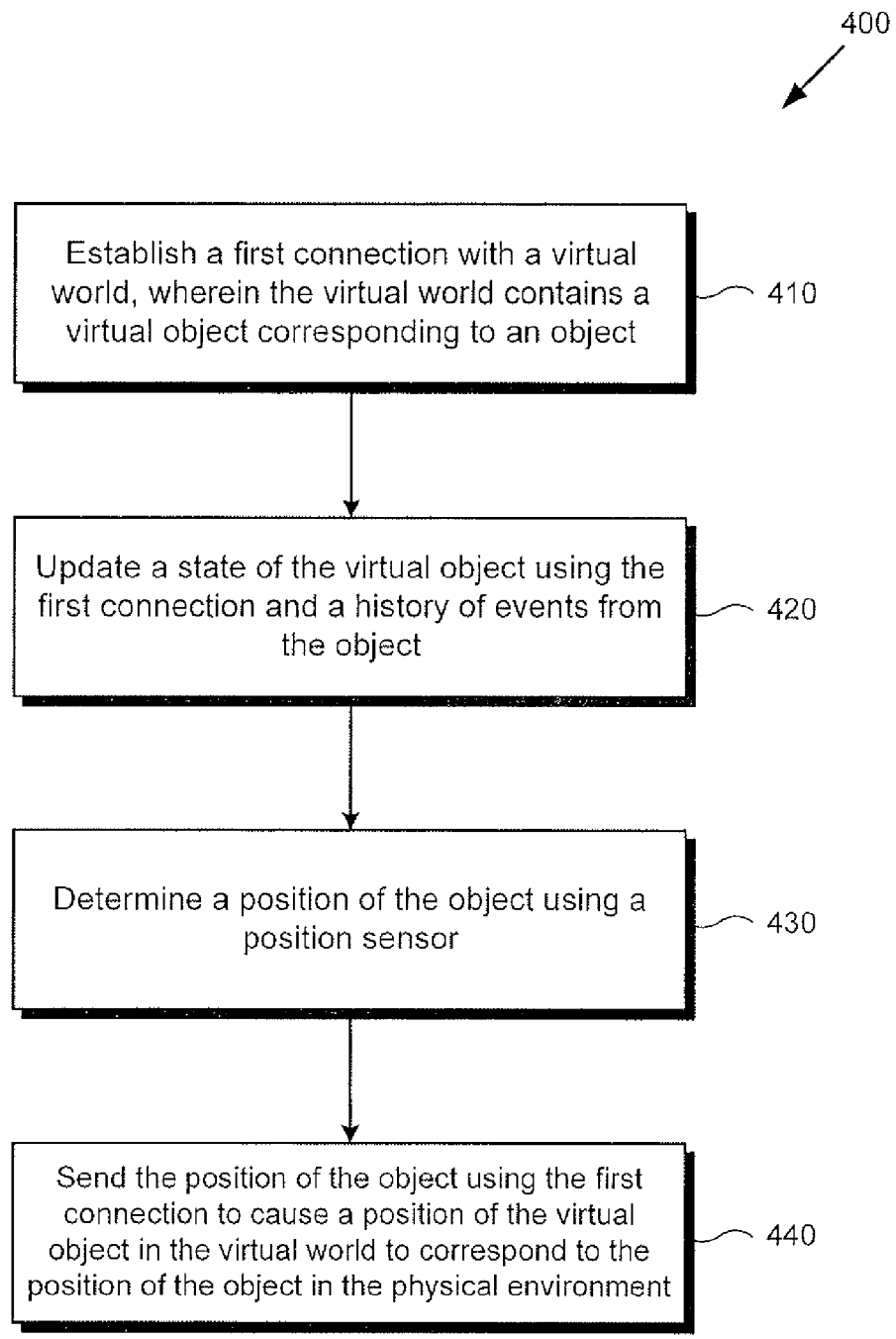
FIG. 4 shows a flowchart describing the steps, according to one embodiment of the present invention, by which a toy object can be used with an environment and connected to a virtual world corresponding to the environment.

Moving to FIG. 4, FIG. 4 shows a flowchart describing the steps, according to one embodiment of the present invention, by which a toy object can be used with an environment and connected to a virtual world corresponding to the environment. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400.

Referring to step 410 of flowchart 400 in FIG. 4 and diagram 100 of FIG. 1, step 410 of flowchart 400 comprises object 120 establishing a first connection with virtual environment 160 hosted on server 150 via host computer 140 and network 145, wherein virtual environment 160 contains virtual object 170 corresponding to object 120. For example, physical environment 110 may include a USB connector connecting directly to host computer 140, which in turn connects to a broadband modem to access network 145, which may comprise the public Internet. As previously described, FIG. 1 only shows one particular method of connectivity, and other methods, such as wirelessly connecting to network 145, might also be utilized.

Referring to step 420 of flowchart 400 in FIG. 4, diagram 100 of FIG. 1, and diagram 200 of FIG. 2, step 420 of flowchart 400 comprises object 220 corresponding to object 120 updating state 277 of virtual object 270 corresponding to virtual object 170 using the first connection established in step 410 and history 225. In other words, timer 222 is compared to the timestamps of events 226a-226b recorded in history 225 to determine a net effect to apply to state 227, which also applies to state 277 of virtual object 270. Of course, events that are evaluated the same regardless of timer 222 may also exist, in which case timer 222 may not need to be consulted. The net effect can then be sent over network 245 using the first connection established previously in step 410, so that state 277 of virtual object 270 can be correspondingly updated.

Referring to step 430 of flowchart 400 in FIG. 4, diagram 100 of FIG. 1, and diagram 200 of FIG. 2, step 430 of flowchart 400 comprises object 120 determining a position of object 120 using position sensor 231. As previously discussed, position sensor 231 may use a variety of technologies to implement three-dimensional position and orientation detection. After step 430, object 120 may determine that it is positioned in room 111a of physical environment 110 and oriented facing outwards towards the consumer.

Referring to step 440 of flowchart 400 in FIG. 4, diagram 100 of FIG. 1, and diagram 200 of FIG. 2, step 440 of flowchart 400 comprises object 120 sending the position determined in step 430 using the first connection established in step 410 to cause a position of virtual object 170 in virtual environment 160 to correspond to the position of object 120 in physical environment 110. As previously described, this could also occur on a continuous basis so that the movements of object 120 and virtual object 170 appear to be synchronized in real-time to the consumer. In this manner, position tracked toy objects providing time contextual interactivity can be used in both offline and online contexts.

For example, to extend the example flowchart 400 shown in FIG. 4, additional steps might be added to emphasize the tracking of offline activity and subsequent credit given online. The first connection might be explicitly terminated, an input might be detected from the variety of sensors contained in sensors 230 of FIG. 2, history 225 may be correspondingly updated with new events, and a new second connection may be established with virtual object 270 over network 245. State 277 may then be updated using this second connection to reflect the newly added events in history 225. Additionally, as previously discussed, this process may also proceed in the other direction, where activity occurring to the virtual object in the online context can be credited to the tangible object when connected online.

From the above description of the invention it is manifest that various techniques can be used for implementing the concepts of the present invention without departing from, its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A virtual gaming system configured to interact with a virtual environment that is accessed by a host system, the virtual gaming system comprising:
    a physical environment configured to operably connect to the host system;
    a physical object comprising a figural toy that has an appearance that resembles the appearance of a virtual object in the virtual environment, wherein the physical object includes a physical object identifier; and
    a physical accessory of the physical object, wherein the physical accessory includes a physical accessory identifier;
    wherein the physical environment is configured to:
        wirelessly sense a position of the physical object in relation to the physical environment, by identifying the physical object identifier using at least one of infrared, radio frequency identification (RFID), electromagnetics, electrical fields and optics;
        wirelessly sense the physical accessory, using the physical accessory identifier;
        communicate a first information regarding the physical object, including the position of the physical object, to the host system; and
        wirelessly store a second information to a memory within the physical object.

2. The virtual gaming system of claim 1, wherein the physical object further comprises an interface for a sensor to indicate the position of the physical object in relation to the physical environment.

3. The virtual gaming system of claim 2, wherein the interface comprises a radio frequency identification (RFID) interface, and wherein the physical environment contains an RFID sensor to read the first information from the RFID interface.

4. The virtual gaming system of claim 3, wherein the memory within the figural toy is configured to store the first information regarding the physical object.

5. The virtual gaming system of claim 4, wherein the RFID sensor is configured to read the first information from the memory.

6. The virtual gaming system of claim 1, wherein the virtual object is a character in the virtual environment.

7. The virtual gaming system of claim 1, wherein the physical environment is configured to wirelessly read the first information from the memory of the physical object and transmit the first information to the host system.

8. The virtual gaming system of claim 7, wherein the virtual object is a character in the virtual environment, and wherein the first information read from the memory and transmitted to the host system updates a state of the character in the virtual environment.

9. The virtual gaming system of claim 1, wherein the physical environment is configured to receive the second information from the host system and wirelessly write the second information to the memory of the physical object.

10. The virtual gaming system of claim 9, wherein the virtual object is a character in the virtual environment, and wherein the second information written to the memory comprises event information corresponding to activities of the character in the virtual environment.

11. The virtual gaming system of claim 1, wherein the physical environment is configured to operably connect to the host system through a universal serial bus (USB) connection.

12. The virtual gaming system of claim 1, wherein the physical environment is configured to operably connect to the host system through a wireless connection.

13. The virtual gaming system of claim 1, wherein the host system is a computer.

14. The virtual gaming system of claim 1, wherein the host system is a console.

15. The virtual gaming system of claim 1, further comprising a computer-readable medium configured to operate with the host system to access the virtual environment.

16. The virtual gaming system of claim 1, wherein the position of the physical object in relation to the physical environment corresponds to an area in the virtual environment.

17. The virtual gaming system of claim 1, wherein the physical object includes an accessory detector configured to detect the physical accessory.

18. The virtual gaming system of claim 17, wherein the physical environment is further configured to:
    wirelessly obtain a third information from the physical object relating to detecting the physical accessory; and
    communicate the third information relating to detecting the physical accessory to the host system.

19. The virtual gaming system of claim 18, wherein a virtual accessory object corresponding to the physical accessory is displayed in the virtual environment.

20. The virtual gaming system of claim 17, wherein the physical accessory is a physical furniture in the physical environment with a corresponding virtual furniture in the virtual environment.

21. The virtual gaming system of claim 1, wherein the physical environment is configured to communicate a third information regarding the physical accessory to the host system.

* * * * *